United States Patent [19]

Schäfer et al.

[11] Patent Number: 5,696,683
[45] Date of Patent: Dec. 9, 1997

[54] METHOD FOR REDUCING DRIVE SLIP OF A VEHICLE

[75] Inventors: Jochen Schäfer, Bietigheim-Bissingen; Thomas Sauter, Remseck, both of Germany

[73] Assignee: Robert Bosch GmbH, Stuttgart, Germany

[21] Appl. No.: 454,399

[22] PCT Filed: Dec. 9, 1994

[86] PCT No.: PCT/DE94/01464

§ 371 Date: Oct. 23, 1995

§ 102(e) Date: Oct. 23, 1995

[87] PCT Pub. No.: WO95/18024

PCT Pub. Date: Jul. 6, 1995

[30] Foreign Application Priority Data

Dec. 24, 1993 [DE] Germany .................. 43 44 634.5

[51] Int. Cl.$^6$ ........................................ B60K 28/16
[52] U.S. Cl. ........................ 364/426.027; 364/431.07; 180/197; 303/142
[58] Field of Search .................. 364/426.01, 426.02, 364/426.03, 431.04, 431.07, 426.027, 426.029; 180/197; 303/139, 142, 149, 155, 170, 112

[56] References Cited

U.S. PATENT DOCUMENTS

| | | | |
|---|---|---|---|
| 4,771,849 | 9/1988 | Leiber et al. | 180/197 |
| 5,103,928 | 4/1992 | Danner et al. | 180/197 |
| 5,132,906 | 7/1992 | Sol et al. | 364/426.02 |
| 5,137,105 | 8/1992 | Suzuki et al. | 180/197 |
| 5,245,542 | 9/1993 | Itoh et al. | 364/426.02 |
| 5,539,643 | 7/1996 | Yamamoto et al. | 364/426.03 |

*Primary Examiner*—Michael Zanelli
*Attorney, Agent, or Firm*—Felfe & Lynch

[57] ABSTRACT

In order to optimize control of drive slip, the torque demand of the drive is determined continuously taking into account the interfering torques acting on the vehicle, and the drive torque is reduced to this torque demand when instability occurs.

6 Claims, 1 Drawing Sheet

METHOD FOR REDUCING DRIVE SLIP OF A VEHICLE

PRIOR ART

It is known to reduce the engine torque in a traction slip controller (TSC) when a tendency of the wheels to spin occurs (see e.g. DE 34 17 089 A1, to which U.S. Pat. No. 4,771,849 corresponds). The engine torque is reduced starting from the moment when a specific wheel slip and/or a specific wheel acceleration of a driven wheel or the driven wheels is reached or by means of some other criterion for the spinning of the wheel or wheels. In order to control the traction slip the fuel supply can be reduced (throttle valve adjustment or control of the quantity injected). It is also possible to influence the ignition (control of spark failure or adjustment of ignition time). In the prior art the engine torque is changed along a slope until it drops below the instability criterion again.

SUMMARY OF THE INVENTION

In the inventive design of the TSC, when a drive instability occurs the engine torque is reduced to that drive torque which is sufficient for the given moment taking into account the interfering influences such as gradient, towed weight and/or payload (torque demand), and at which spinning cannot occur. The torque demand is calculated continuously so that when required it is available immediately for the control.

It is possible (if the mass of the vehicle, the mass inertia moments, air resistance and rolling resistance are known) to assign the speed and acceleration to be achieved to a specific drive torque MA for driving on the level.

Deviations from this are caused by additional torque demand, that is to say e.g. by gradient, payload or towed weight. (It is not known to detect the values of these interfering variables without additional sensors).

In order to detect the values of these interfering variables it has proven advantageous to select the equivalent mass as auxiliary variable, which equivalent mass is equal, without the interfering torques, to the prescribed vehicle mass, but is increased or even decreased when interfering torques occur.

The increased torque demand is assigned to the rolling resistance and the acceleration as a result of increased mass (equivalent mass). In the case of vehicle acceleration on the level the following applies:

Drive torque MA=air resistance MWL+rolling resistance torque MWR+acceleration resistance MWB+rotational acceleration resistance MWBR

MA=MWL+MWR+MWB+MWBR

MA=k1*$v^2$+k2*m+k3*m*a+MWBR, v being the speed of the vehicle, m being the vehicle mass, a being the acceleration and k1 to k3 being vehicle-specific constants.

The equivalent mass MERS is thus calculated as:

$$MERS = \frac{MA - MWL - MWBR}{k3 * a + k2}$$

In the case of instability, the drive torque is reduced to the actual torque demand on the basis of the learnt equivalent mass. An increased torque demand, for example, as a result of payload, gradient or towed weight is thus taken into account during the calculation of the level of the torque demand, as is a reduced torque demand for example as a result of a negative gradient.

Additional sensors for determining the road resistance are not required.

The reduction drive torque (torque demand) MAR is obtained from the following derivation. It applies for an accelerating vehicle:

MAR=MWL+MWR+MWB*F

This yields the following:

MAR=k1*$v^2$+k2*MERS+k3*MERS*a*F it being possible for the acceleration resistance MWB to be multiplied by a factor F in order to influence propulsion or comfort. It will be near to 1.

In order to suppress negative influences, the speed of increase of the equivalent mass is limited, e.g. to 12.00 kg/s.

In order to obtain the correlation of the equivalent mass and drive torque (and acceleration) it is appropriate to filter the signal with a PT1 filter.

The drive torque MA can be calculated from the output engine torque MMOT

| | |
|---|---|
| MA = MMOT * iGES * η | for vehicle with manual shift transmission |
| MA = MMOT * iGES * η * μ | for vehicle with automatic transmission | iGES being the overall transmission ratio, η being the degree of efficiency and μ being the converter transmission ratio. The gear can be calculated from the ratio of the speed of revolution of the engine to that of the drive axle or determined in some other way.

In automatic vehicles the gear information is obtained for example from the gearbox control.

The output engine torque MMOT can either be determined by means of a characteristic diagram MMOT=f (nMot, α) (nMot engine speed, α throttle valve angle) or by means of a load signal generated by a digital engine control.

DETAILED DESCRIPTION OF THE PREFERRED EMBODIMENT

Figure 1:
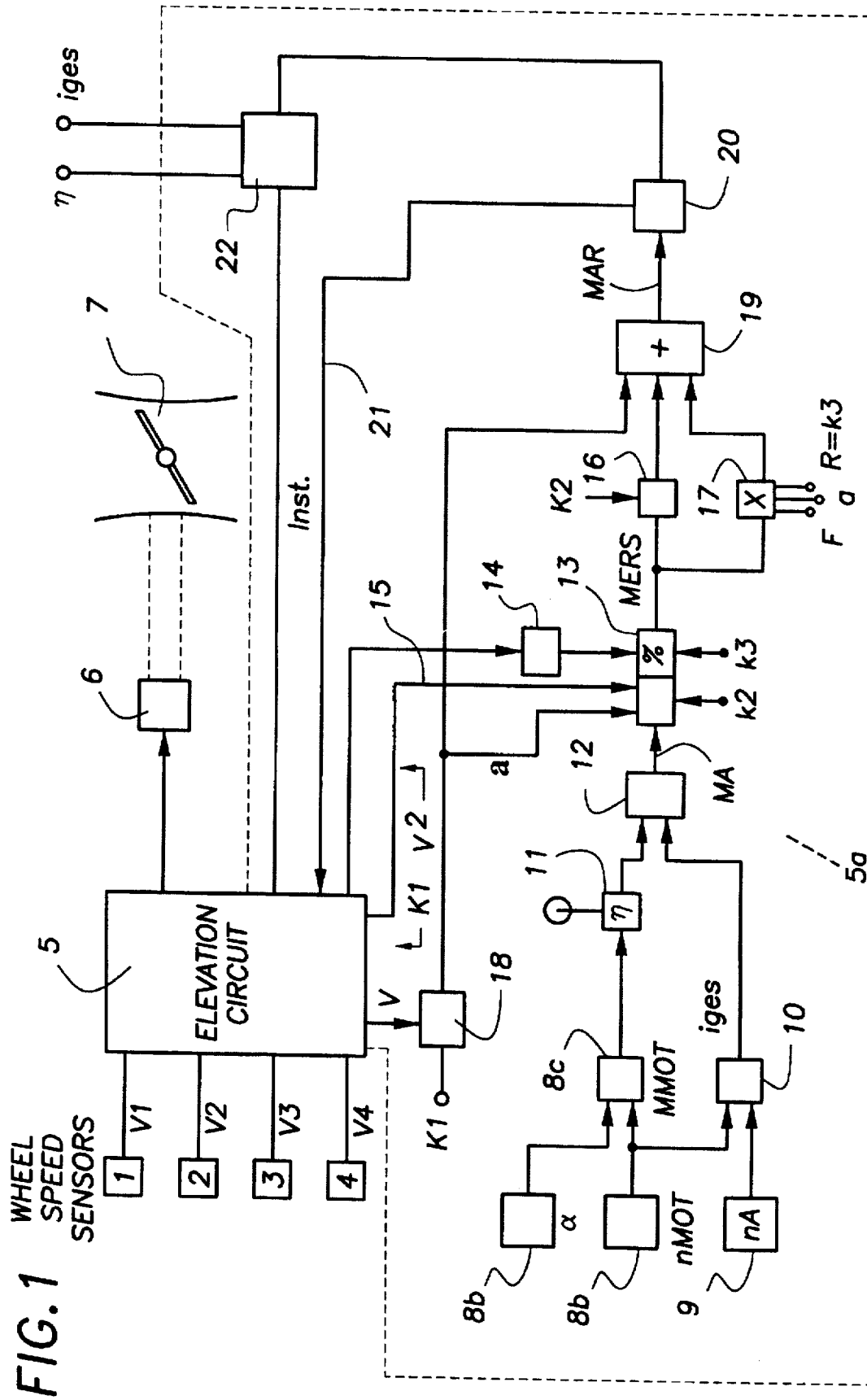
FIG. 1 shows a block diagram of the exemplary embodiment. The teaching of the invention can also be realized with an appropriately programmed microprocessor.

The wheel speed sensors 1 and 2 of the driven wheels and the wheel speed sensors 3 and 4 of the nondriven wheels transport signals to an evaluation circuit 5 which determines with the aid of the signals v1 to v4 of the sensors 1 to 4 whether an unacceptable wheel slip λ1 occurs at one or two wheels (e.g. λ1=v1−(v3+v4)/2; λ1>a threshold). A detected instability controls a final control element 6 which adjusts the throttle valve 7 of the vehicle.

The evaluation circuit is expanded here according to the invention with a component 5a. The speed of revolution of the engine nMOT is fed to this component 5a by a sensor 8a, the position of the throttle valve α is fed to the component 5a by a sensor 8b and the speed of revolution of the drive axle nA is fed to the component 5a by a sensor 9: by comparing the speeds of revolution nMOT and nA in a comparator 10 the gear i1, i2, . . . i5 selected and hence also the overall transmission ratio iGES of the drive train are obtained. A characteristic diagram is stored in a block 8c, and when the engine speed nMOT and the throttle valve angle α are input the block 8c outputs a signal corresponding to the engine torque MMOT. By multiplying the engine torque MMOT by the degree of efficiency η in a multiplier 11 and by multiplying this product MMOT*η by iGES in the multiplier 12 the drive torque
MA=MMOT*η*iGES is obtained.

In another branch (block 18), the expression $k1*v^2$ is formed from the vehicle speed v=v3+v4/2 supplied by the evaluation circuit 5. k1 is a vehicle-specific constant which is defined as follows:

$$k1 = c_w * A_L * (\rho/2) * R,$$

where $c_w$=the coefficient of the air resistance $A_L$=the end face of the vehicle.

ρ=air density

R=radius of the wheel and e.g. is 0.278 kg.

Both the signal corresponding to the variable $k1v^2$ and the signal corresponding to the variable MA are fed to a subtractor/divider block 13 to which a signal which is produced in a block 14 and which corresponds to the expression MWBR=I*DVMAN/R is also fed. Here I is a constant and DVMAN is the rate of change of the average speed of the driven wheels, i.e., the driven wheel acceleration.

The block 13 produces a signal corresponding to the equivalent mass $$MERS = \frac{NA - k1v^2 - MWBR}{k3 * a + k2}$$

the acceleration signal a, fed via a line 15, of the vehicle also being required, it being possible for the acceleration signal to be determined in the evaluation circuit from the change in the speed of the vehicle (v3+v4)/2. In addition, the vehicle-specific constants k2 and k3 are also required; they can be determined as follows:

$k2=f_R*g*R$ $k3=R$ where $f_R$=coefficient of rolling resistance g=drop acceleration and R=radius of wheel I=moment of inertia and k2 can be for example 0.038 m²/s² and R can be 0.3 m.

At the output of the block 13 the signal is present which corresponds to the equivalent mass MERS and is multiplied by k2 in a multiplier 16. In addition, the expression MERS*a*R is formed in a multiplier block 17.

The signals of the blocks 16, 17 and 18 are fed to an adder 19 which, by addition, forms a signal corresponding to the torque demand
MAR=MWL+MWR+MWB*F
MAR=$k1*v^2$+k2*MERS+k3* MERS*a*F If instability occurs this is reported to the block 20 via a line 21, the block 20. then outputting MAR which is fed to a block 22. The block 22 calculates back the torque MAR to give the engine torque MMOT with gear transmission ratio and converter transmission ratio and degree of efficiency. A signals, is produced which corresponds to the desired position of the throttle valve 7 and which acts on the final control element via the evaluation circuit 5 and as a result quickly resets the throttle valve 7 in such a way that only the torque demand continues to be effective. The further control on the basis of this torque demand is now carried out in a customary way by the evaluation circuit 5.

The block 13 can have at its output component a limiter which limits the speed of increase of the equivalent mass. A further limiter which prescribes a maximum value of the equivalent mass may also be provided. In addition, the block 13 can contain a filter arrangement which brings about the correlation of equivalent mass, drive torque (and acceleration).

We claim:

1. Method for reducing the drive slip of a vehicle, having driven wheels and non-driven wheels, said vehicle having a mass m and an engine which outputs drive torque MA to drive said driven wheels, said method comprising determining speeds of the driven and non-driven wheels, determining a vehicle speed v based on the speeds of at least the non-driven wheels, determining a vehicle acceleration a based on the vehicle speed v, determining the drive slip λ of the driven wheels based on the speeds of the driven wheels and the vehicle speed, continuously calculating a torque demand MAR at the driven wheels based on the vehicle speed v, the vehicle acceleration a, the mass m, and the drive torque MA, and reducing the torque output MA to said torque demand MAR when said drive slip λ exceeds a predetermined threshold.

2. Method as in claim 1 wherein said torque demand MAR is calculated by calculating a torque MWL corresponding to air resistance based on the vehicle velocity v, calculating an equivalent mass MERS based on MA, v, and a, calculating rolling resistance torque MWR based on said equivalent mass MERS, calculating an acceleration resistance MWB based on said equivalent mass MERS and said vehicle acceleration, and calculating MAR from MWL, MWR, and MWB.

3. Method as in claim 2 wherein the equivalent mass MERS is determined according to MERS=(MA−K1v²)/ (K3*a+K2), wherein K1, K2, and K3 are vehicle specific constants.

4. Method as in claim 3 further comprising calculating a rotational acceleration resistance MWBR based on the speeds of the driven wheels, and calculating the equivalent mass MERS according to MERS=(MA−K1v²−MWBR)/ (K3*a+K2).

5. Method as in claim 2 wherein said equivalent mass MERS exhibits a rate of increase over time which is limited.

6. Method as in claim 2 wherein said equivalent mass MERS is transmitted as a signal which is time-filtered.

* * * * *

UNITED STATES PATENT AND TRADEMARK OFFICE
CERTIFICATE OF CORRECTION

PATENT NO.    : 5,696,683
DATED         : December 9, 1997
INVENTOR(S)   : Schafer et al.

It is certified that error appears in the above-identified patent and that said Letters Patent is hereby corrected as shown below:

Column 2,
Line 50, change "transport" to -- transmit --.

Column 3,
Line 59, after "20" delete -- . --.

Signed and Sealed this

Twenty-third Day of July, 2002

Attest:

JAMES E. ROGAN
Attesting Officer    Director of the United States Patent and Trademark Office